US010995631B2

(12) United States Patent
Raykowski

(10) Patent No.: US 10,995,631 B2
(45) Date of Patent: May 4, 2021

(54) METHOD OF SHEDDING ICE AND FAN BLADE

(71) Applicant: PRATT & WHITNEY CANADA CORP., Longueuil (CA)

(72) Inventor: Alex Raykowski, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 107 days.

(21) Appl. No.: 16/371,601

(22) Filed: Apr. 1, 2019

(65) Prior Publication Data

US 2020/0308980 A1    Oct. 1, 2020

(51) Int. Cl.
*F01D 5/14*        (2006.01)
*F01D 25/02*       (2006.01)
*F04D 29/38*       (2006.01)
*F04D 29/54*       (2006.01)

(52) U.S. Cl.
CPC ............ *F01D 25/02* (2013.01); *F01D 5/147* (2013.01); *F04D 29/388* (2013.01); *F04D 29/542* (2013.01); *F05D 2240/305* (2013.01)

(58) Field of Classification Search
CPC ........ F01D 5/147; F01D 25/02; F04D 29/388; F05D 2240/301; F05D 2240/31
See application file for complete search history.

(56) References Cited

U.S. PATENT DOCUMENTS

| 4,720,239 A | 1/1988 | Owczarek |
| 5,913,661 A * | 6/1999 | Panovsky ................. F01D 5/16 416/229 A |
| 7,828,526 B2 * | 11/2010 | Cairo .................... F04D 29/322 416/224 |
| 8,241,003 B2 * | 8/2012 | Roberge ................ F04D 29/023 416/229 R |
| 8,794,926 B2 | 8/2014 | Routier |
| 8,814,529 B2 | 8/2014 | Fiala et al. |
| 10,107,302 B2 | 10/2018 | Berschback et al. |
| 2015/0361798 A1 * | 12/2015 | Cosby ..................... F01D 5/147 416/219 R |

FOREIGN PATENT DOCUMENTS

GB      2436861      10/2007

* cited by examiner

*Primary Examiner* — Ninh H. Nguyen
(74) *Attorney, Agent, or Firm* — Norton Rose Fulbright Canada LLP

(57) ABSTRACT

A gas turbine engine can have compressor or fan blades having elongated indentations formed in the radially-inner portion of the pressure face, each elongated indentation having a curved bottom extending transversally between sharp edges, the sharp edges delimiting a width of the elongated indentation from adjacent surfaces of the blade pressure face. During operation of the gas turbine engine, ice can accumulate on the blade, covering the elongated indentations, and the elongated indentations can cause crack appearance in the vicinity of its edge.

20 Claims, 3 Drawing Sheets

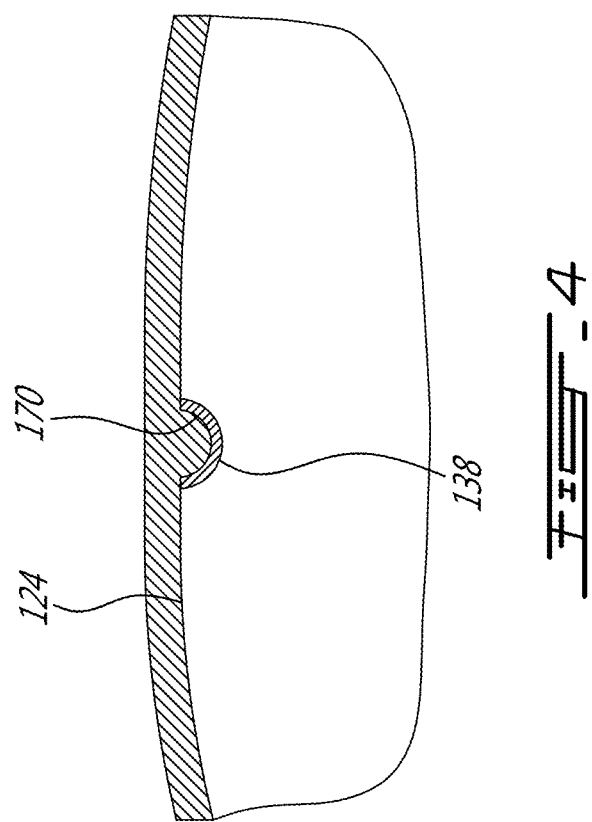

METHOD OF SHEDDING ICE AND FAN BLADE

TECHNICAL FIELD

The application is related generally to gas turbine engine and, more particularly, to icing removal and mitigation systems therefore.

BACKGROUND OF THE ART

Certain combinations of atmospheric conditions can lead to the accumulation of ice on engine components. The fan of a turbofan engine, in particular, is an example of a component which can be subjected to ice accumulation. While aircraft gas turbine engines are typically designed in a manner to limit the impact of this phenomena, there remains room for improvement.

SUMMARY

In one aspect, there is provided a method of operating a turbofan engine comprising in serial flow communication a fan, a compressor section, a combustor, and a turbine section, the fan having a plurality of circumferentially interspaced blades, and elongated indentations on a radially inner portion of corresponding ones of the blades, the method comprising, during rotation of the fan: an ice layer forming on a surface of one or more of the blades, the ice layer at penetrating, and least partially covering, one or more of said elongated indentations, a crack appearing in the ice layer, in the vicinity of an elongated indentation edge, and spreading, leading to the shedding of fragments of the ice layer.

In another aspect, there is provided a gas turbine engine comprising in serial flow communication a compressor section, a combustor, and a turbine section, further comprising a rotor having a plurality of circumferentially interspaced blades, the blades having a pressure face and a suction face, a radially-outer portion and a radially-inner portion, and elongated indentations formed in the radially-inner portion of the pressure face of corresponding blades, each elongated indentation having a curved bottom extending transversally between sharp edges, the sharp edges delimiting a width of the elongated indentation from adjacent surfaces of the blade pressure face.

In a further aspect, there is provided a turbofan blade having a pressure face and a suction face, a radially-outer portion and a radially-inner portion, and an elongated indentation at least partially formed in the radially-inner portion of the pressure face of the turbofan blade, the elongated indentation having a bottom extending transversally between sharp edges, the sharp edges delimiting the elongated indentation from adjacent surfaces of the blade pressure face.

DESCRIPTION OF THE DRAWINGS

Reference is now made to the accompanying figures in which:

FIG. 4 is another partial cross-section, similar to FIG. 3, showing a variant.

DETAILED DESCRIPTION

Figure 1:
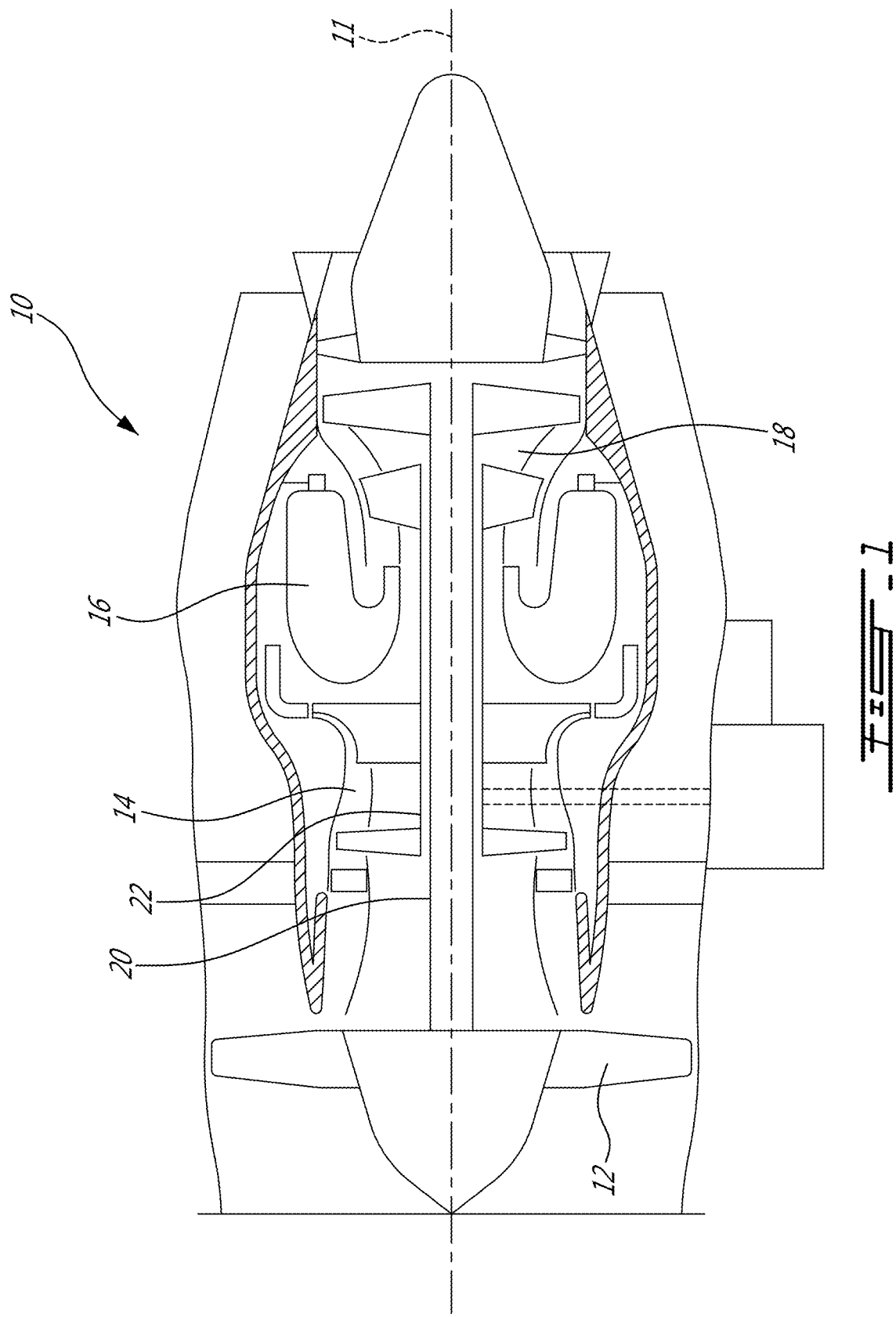
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 can include one or more rotors 20, 22 which each can have blades of one or more of the fan 12, the compressor section 14 or the turbine section 18. In a turbofan gas turbine engine, the fan 12 is especially prone to ice accumulation, however, the compressor section 14 can be prone to ice accumulation as well, and the regions of rotor components subjected to ice accumulation can vary by engine model, engine size, and engine type. In this embodiment, the turbofan gas turbine engine 10 includes a low pressure rotor 20 including fan blades and second turbine stage blades, and a high pressure rotor 22 including compressor blades and first turbine stage blades. The rotors 20, 22 can include shafts which receive the blades and which are mounted to non-rotating engine components (e.g. engine casing) via bearings. The blades can be manufactured independently and attached to the shaft, or integrally formed with the rotor, to name two examples.

The blades of a given rotor element (e.g. fan, compressor stage) can be axially aligned with one another, and regularly circumferentially interspaced from one another. Since the fan of a gas turbine engine is particularly prone to ice accumulation, fan blades will be used to form the basis of the following example, with reference to FIGS. 2 and 3, but it will be understood that this example is presented in a non-limiting manner, and that alternate embodiments can be based on other rotor elements than fans.

Figure 2:
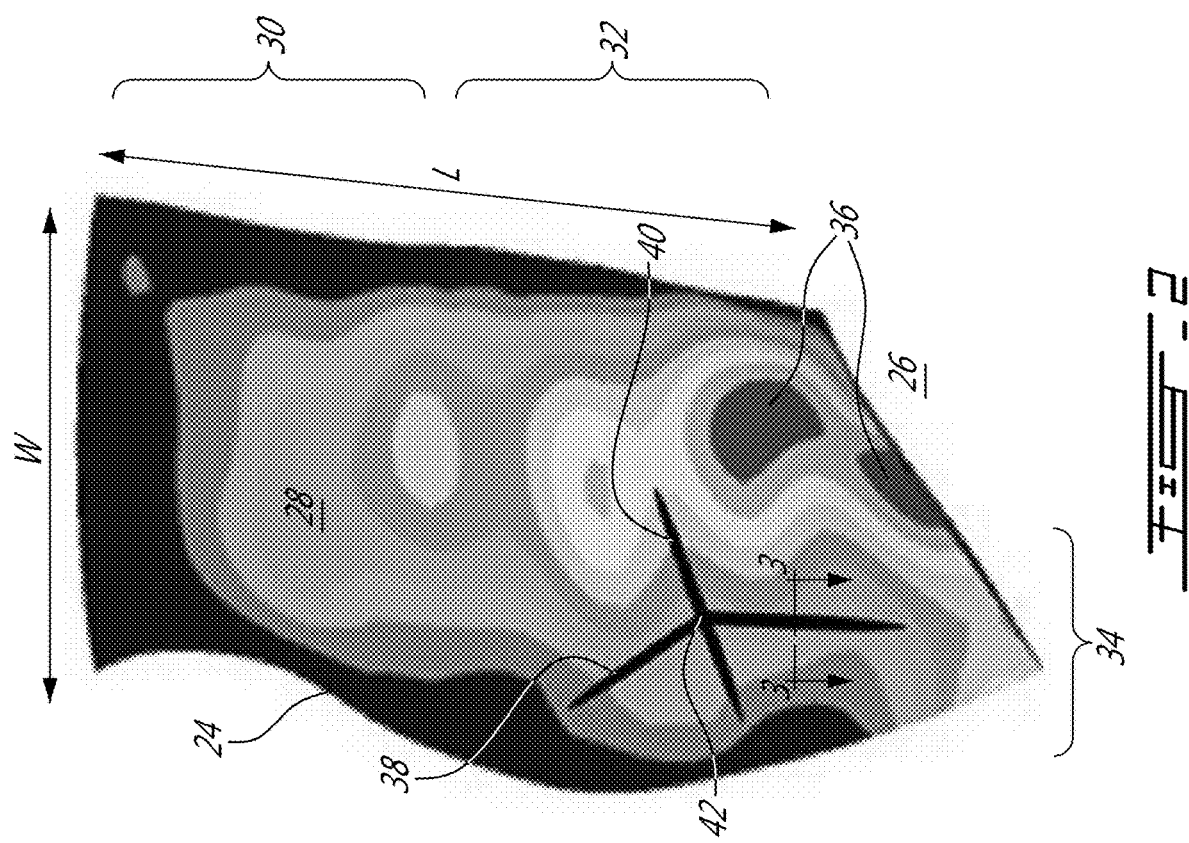
FIG. 2 is a side elevation view of a turbofan blade, in accordance with an embodiment.

As shown in FIG. 2, a blade 24 can have a length L extending generally radially from the shaft 26, and have a generally axially-oriented chord or width W. Blades are typically relatively thin between two opposite sides. The opposite sides can be referred to as the pressure face and the suction face, the pressure face 28 being shown in FIG. 2. The pressure face 28 is the face of the blade which faces the direction of rotation, and the suction face is the opposite face which faces away from the direction of rotation. In modern engines, blades have complex shapes to optimize aerodynamic and structural efficiency, and so both faces can be curved to varying extents. Along its length L, each blade 24 can be considered to have a radially-outer portion 30 or radially-outer half, and a radially-inner portion 32 or radially-inner half. In this specification, the expression radially-outer half or radially-inner half will be considered having a greater degree of precision relative to half of the length of the blade, than the expressions radially-inner portion and radially-outer portion.

As shown more clearly in FIG. 2, the fan blade 24 can be provided with one or more elongated indentations 38, 40. In this embodiment, the fan blade 24 can be considered to have two intersecting elongated indentations 38, 40. The elongated indentations 38, 40 are generally provided in the radially-inner portion 32 of the fan blades, on the pressure face 28, and generally extend along the first half 34 of the width W of the blade 24, adjacent the leading edge. This region is selected for two reasons. Firstly, it is determined to be a region which is prone to ice accumulation based on testing. Secondly, this region avoided the main regions 36 of high stress concentration which had been identified on the blade 24 based on computer-assisted simulations. Thirdly, this region is typically characterised by the highest magnitude of the blade thickness.

Figure 3:
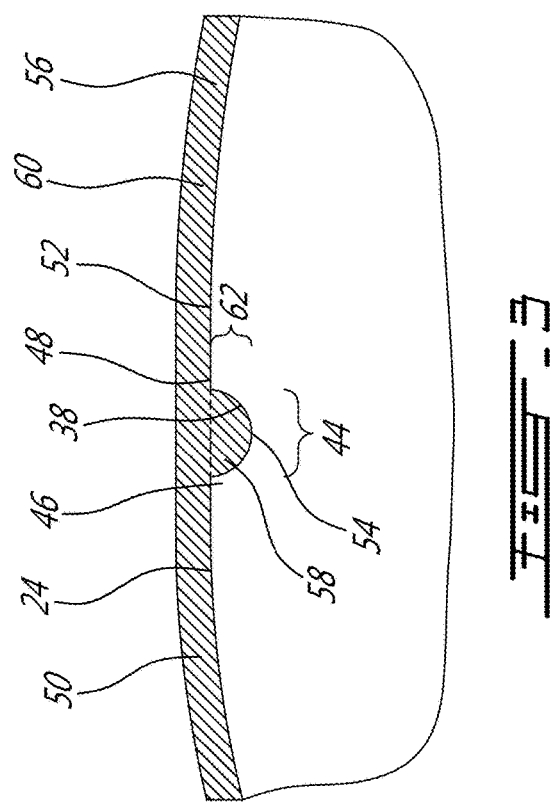
FIG. 3 is a partial cross section taken along lines 3-3 of FIG. 2.

FIG. 3 shows a fragmented cross-section of a portion of the fan blade 24. The elongated indentation 38, or more specifically its cross-sectional shape, can be seen to generally have a curved surface extending transversally between relatively sharp edges 46, 48. The sharp edges 46, 48 delimit the width 44 of the elongated indentation 38 from adjacent surfaces 50, 52 of the blade pressure face 28. The sharp edges 46, 48 together with the ice bulge 58 were found to favor ice shedding by imposing a stress concentration on the ice layer, whereas the smoothly curved feature of the elongated indentation surface extending from the sharp edges and including the bottom 54 was found to limit appearance of high stresses in zones of the indentations in the body of the fan blade 24.

During operation of the gas turbine engine, i.e. while the fan is rotating and when certain meteorological conditions are met, an ice layer 56 can begin to accumulate in the region of the fan blade 24 which is prone to ice accumulation. In this embodiment, this region prone to ice accumulation is on the radially-inner portion 32, and axially-forward portion 34, of the pressure face 28 of the fan blade 24. The ice layer 56 can naturally extend over the elongated indentations 38, 40, leading to ice accumulation penetrating into the depression of the elongated indentations 38.

Ice layers can naturally shed off such surfaces once they reach a certain thickness/weight, due to centrifugal acceleration and potentially assisted by vibrations or shocks. However, it can be desired to favor ice shedding as early as possible, especially considering that if shed earlier, the ice layer will typically be thinner, and less likely to cause impacts along the gas path. Inducing shedding of ice in smaller fragments, or slabs, independently of the fragment's thickness, can also be desirable.

Indeed, during engine being operational in the conditions prone to ice formation on the blade surfaces, the elongated indentations are becoming filled with water droplets which get frozen at the same time when an ice layer is built on the area of the blade subjected to ice accretion. Considering the resistance to shear force acting along the entire surface of accretion, there can be an additional effect prompting ice shedding due to a difference between shear adhesion strengths firstly for the regions where ice is attached to metal, and secondly where the ice protrudes the indentation, i.e. the ice layer being adhered to the indentation filled in ice. In some embodiments, the effectiveness of the method can be amplified via additional features such as the use of anti-icing coating, of ice phobic materials, etc. Stress concentrations induced by the indentations on the ice layer can be the most important factor in the appearance of a crack in the vicinity of the elongated indentations in some embodiments. The variance of adhesion shear strengths, and an enforcement of the occurrence of stress concentrations in the ice layer can make the aerodynamic and centrifugal forces acting more forcefully along the indentations thus leading to the crack initiation (appearance), propagation, and triggering of sequential cracks.

In the illustrated embodiment, the overall presence of a portion 58 may establish, by its engagement with the surface of the elongated indentation 38, a difference in resistance, against centrifugal, aerodynamic, or frictional forces along the ice adhered surface between the portions 50/52 and the portion 44 of the face 28 of the blade 24. The featured difference in resistance may be associated with generation of internal stresses within the ice layer 56, primarily in the vicinity of edges 46, 48 of the elongated indentations 38, 40, leading to the initiation (appearance) of the crack/cracks in the ice layer 56.

Once the crack has appeared, it can propagate along the corresponding edge of the elongated indentation 38 within an established region of higher stress concentration, and therefore spread rapidly, potentially leading to early shedding of the ice layer. To this end, a longer indentation 38 can be preferred over a shorter one.

In the illustrated embodiment, two elongated indentations 38, 40 were used on the pressure face of the blade, and the two elongated indentations 38, 40 were provided in a manner to intersect one another, at a region which will be referred to herein as a hub 42. A configuration of intersecting elongated indentations can be suitable in some embodiments, as a crack in the ice layer spreading to the hub 42 can, from there, spread along the intersecting elongated indentation 40.

When regarding designing elongated indentations for alternate embodiments, one can reflect on the following. Firstly, while there may be an advantage, from the point of view of ice shedding, to provide more elongated indentations to cover a greater portion of the blade, one can also consider that the elongated indentations can have an effect on the aerodynamic efficiency and on the structural integrity of the blade. Accordingly, given these latter considerations, it can be preferred to use a smaller number of strategically positioned indentations over a greater number of more evenly spread out indentations in some embodiments. In this logic, one can choose the regions which are both i) considered prone to ice accumulation and ii) considered to be free of high internal stress concentrations. Using longer, and intersecting, indentations can be a way to increase the effect of the elongated indentations via crack propagation, by contrast with an approach using the same surface area of elongated indentations, but without as much length or without intersecting which may not benefit as much from the effect of crack propagation.

Moreover, the size and shape of the cross-section of the elongated indentation can have an impact on the aerodynamic efficiency. In the embodiment presented above, it was considered that to have a satisfactory efficiency, the elongated indentations should have at least 2 mm in depth 62, between the edges 46, 48 and the bottom 54. Moreover, the ratio of width 44 to depth 62 can also be a substantial design factor. In the embodiment presented above, it is considered that to have a satisfactory efficiency, the ratio of width 44 to depth 62 of the elongated indentations 38, 40 should be within 1 to 2. In alternate embodiments, the ratio of width to depth of the elongated indentations can be selected to be closer to 1.25, for instance. Moreover, to avoid having an undesirable level of effect on the structural integrity of the blade, in this embodiment, it is chosen to limit the depth of the elongated indentations to a maximum of 30% of the thickness of the blade, as measured between the pressure face and the suction face at the region where the elongated indentation is applied. The ratio of length to width, in the example presented above, can be of about 20 to 1, 40 to 1, or more, bearing in mind that the inconveniences of the elongated indentations may rapidly overcome the advantages of the elongated indentations in regions which are less prone to ice accumulation, and that such regions can be identified by testing.

In the embodiment presented above, the cross-sectional shape of the elongated indentation is semi-circular. It will be understood that in alternate embodiments, the cross-sectional shape of the elongated indentation can be semi-oval, or have another smoothly curved shape to avoid sharp corners in the blade body depth which could create regions of high stress concentration adverse to the blade itself if positioned deep relative to the pressure face 28 of the blade 24. The sharpness of the edges 46, 48, by contrast to the effect on blade, can be favored to impart regions of high stress concentration in the layer of ice 56 spreading over the area of ice accretion.

As illustrated in FIG. 4, in an alternate embodiment, the elongated indentation 138 provided in a face of a blade 124 can have its surface covered by a layer of an anti-icing coating.

The above description is meant to be exemplary only, and one skilled in the art will recognize that changes may be made to the embodiments described without departing from the scope of the invention disclosed. For example, in other types of gas turbine engines, elongated indentations can be specifically designed on blades other than the fan blades. For instance, it can be useful in some embodiments to use elongated indentations on compressor blades of turboprop or turboshaft engines, for instance. Still other modifications which fall within the scope of the present invention will be apparent to those skilled in the art, in light of a review of this disclosure, and such modifications are intended to fall within the appended claims.

The invention claimed is:

1. A method of operating a turbofan engine with a fan having a plurality of circumferentially spaced blades, the method comprising:
providing elongated indentations on a radially inner portion of at least some of the blades, the indentations configured such that, in use during engine icing conditions, an ice layer forming on the fan blade penetrates and least partially covers one or more of said elongated indentations.

2. The method of claim 1 wherein the elongated indentations are configured such that in use, when covered by the ice layer, the elongated indentations cause an appearance of a crack spreading along a length of the elongated indentation.

3. The method of claim 2 wherein the elongated indentations include at least two elongated indentations intersecting with one another at a hub configured such that in use, when covered by the ice layer, the crack spreading along a length of one of the at least two elongated indentations reaches the hub, and spreads along the intersecting elongated indentation.

4. The method of claim 1 further comprising, during rotation of the fan, at least one of said elongated indentations holding a portion of the ice layer penetrating into the elongated indentation, while an adjacent portion of the ice layer covering a face of the blade adjacent the elongated indentation is pulled away from the penetrating portion of the ice layer due to centrifugal acceleration, thereby causing internal stress.

5. A gas turbine engine comprising a rotor having a plurality of circumferentially spaced blades, the blades having a pressure face and a suction face, a radially-outer portion and a radially-inner portion of the blade span, and elongated indentations on the radially-inner portion of the pressure face of the blades, the elongated indentations having a curved surface extending between discontinuous edges delimiting the elongated indentations from the blade pressure face.

6. The gas turbine engine of claim 5 wherein the gas turbine engine is a turbofan engine, and the blades are fan blades.

7. The gas turbine engine of claim 5 wherein a depth of indentations is at least 2 mm relative to adjacent surfaces of the blade pressure face.

8. The gas turbine engine of claim 5 wherein a depth of indentations is less than 30% of a thickness of the blade between the pressure face and the suction face, the thickness taken at the location of the indentations.

9. The gas turbine engine of claim 5 wherein the ratio of width to depth of the elongated indentations is between 1 and 2.

10. The gas turbine engine of claim 5 wherein the ratio of width to depth of the elongated indentations is between 1.25 and 2.

11. The gas turbine engine of claim 5 wherein the ratio of length to width of the elongated indentations is at least 20 to 1.

12. The gas turbine engine of claim 5 wherein the ratio of length to width of the elongated indentations is of at least 40 to 1.

13. The gas turbine engine of claim 5 wherein the elongated indentation has a semi-circular or semi-oval cross-sectional shape.

14. The gas turbine engine of claim 5 wherein each blade has at least two intersecting elongated indentations.

15. The gas turbine engine of claim 5 wherein each blade has a first elongated indentation aligned along the length of the blade, and a second elongated indentation intersecting the first elongated indentation.

16. The gas turbine engine of claim 5 wherein the elongated indentations are positioned in a manner to span a portion of the blades which is both an ice accumulation area of the blades and a low stress concentration area of the blades.

17. A turbofan blade having a pressure face and a suction face, a radially-outer portion and a radially-inner portion, and at least two elongated indentations intersecting one another, the at least tow indentations at least partially formed in the radially-inner portion of the pressure face of the turbofan blade, the elongated indentation having a curved bottom extending transversally between sharp edges, the sharp edges delimiting the elongated indentation from adjacent surfaces of the blade pressure face.

18. The turbofan blade of claim 17 wherein the curved bottom extends to a depth of at least 2 mm relative to adjacent surfaces of the blade pressure face, and the ratio of width to depth of the elongated indentations is of between 1 and 2.

19. The turbofan blade of claim 17 wherein the elongated indentation has a semi-circular or semi-oval cross-sectional shape.

20. The turbofan blade of claim 17, wherein the sharp edges are discontinuous.

\* \* \* \* \*